W. M. LUTHER.
DEHYDRATOR.
APPLICATION FILED SEPT. 26, 1919.
1,353,167.
Patented Sept. 21, 1920.
9 SHEETS—SHEET 1.
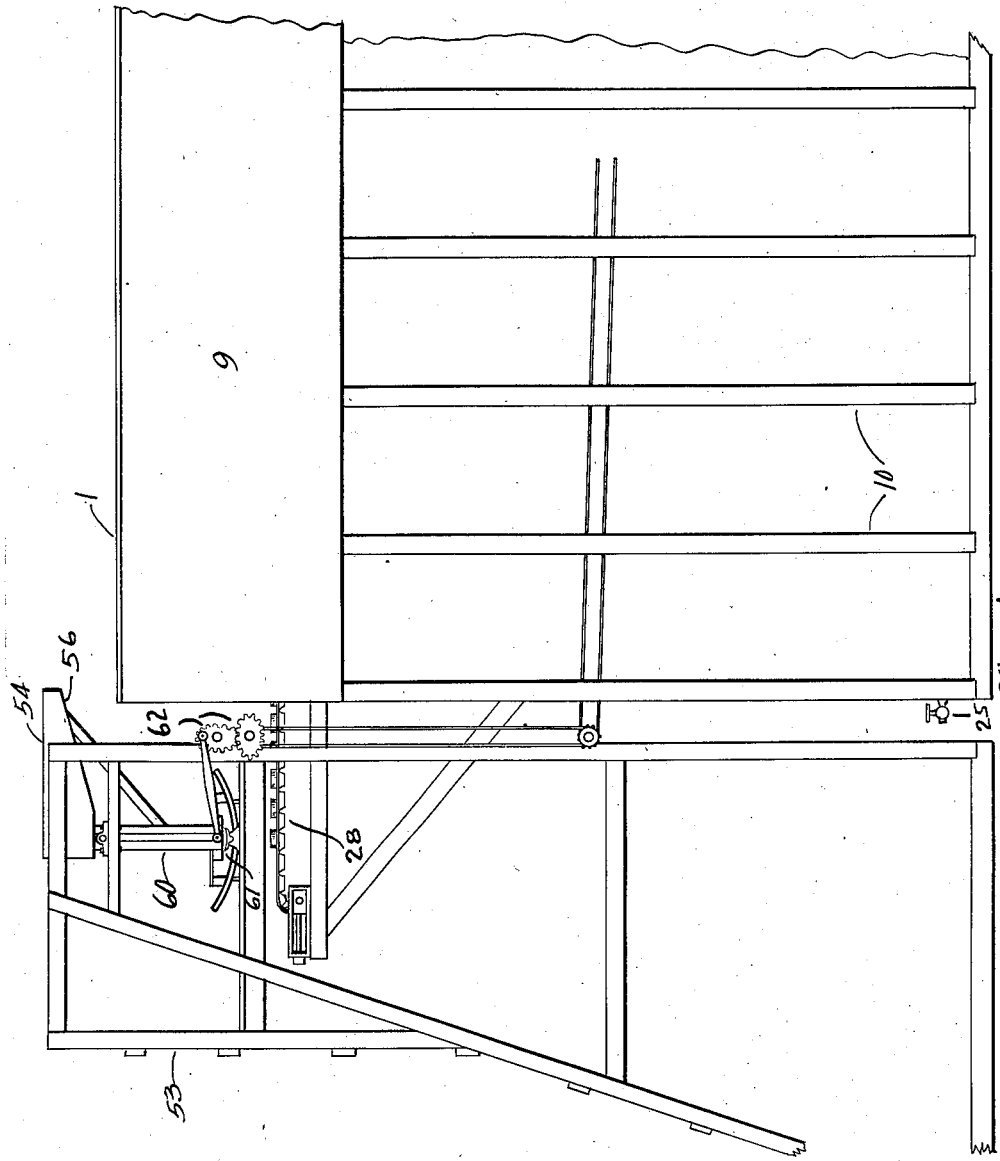
Inventor
WILLIAM M. LUTHER
By
Attorney.

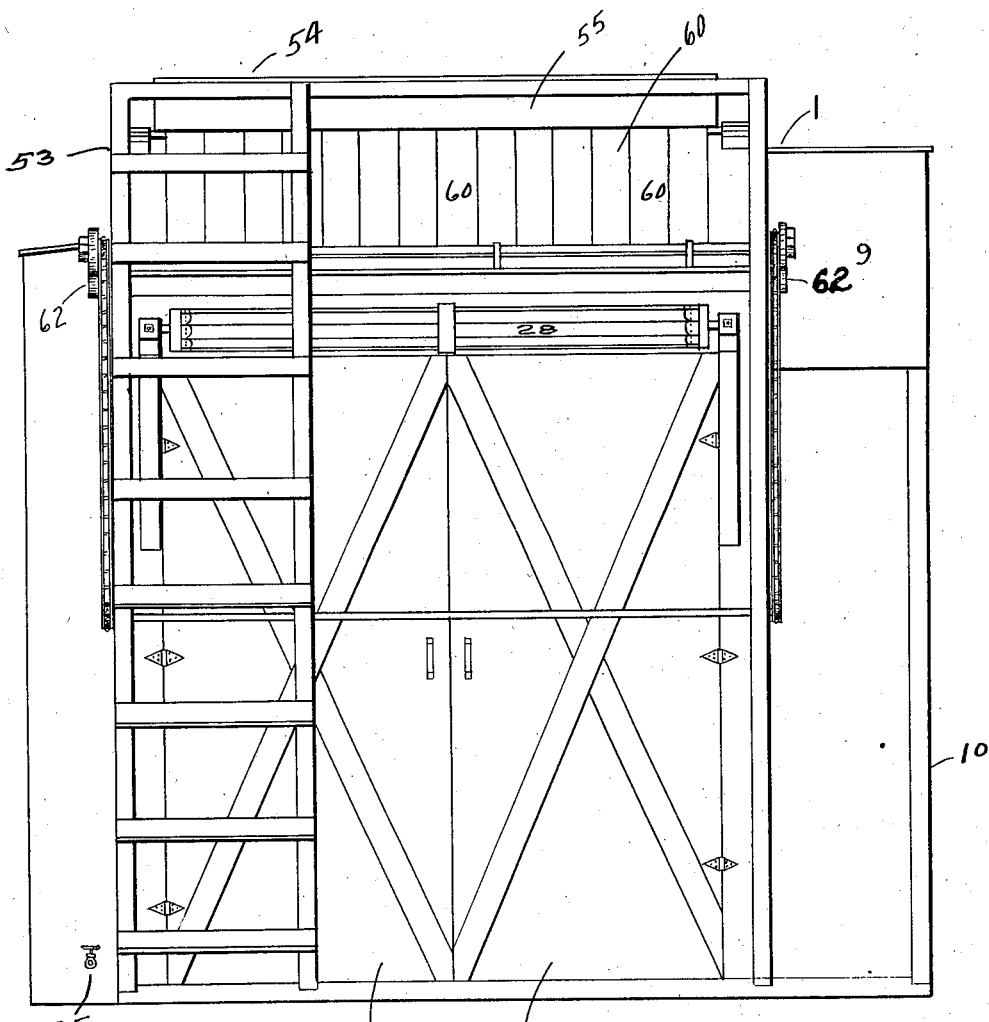

W. M. LUTHER.
DEHYDRATOR.
APPLICATION FILED SEPT. 26, 1919.
1,353,167.
Patented Sept. 21, 1920.
9 SHEETS—SHEET 3.
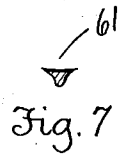
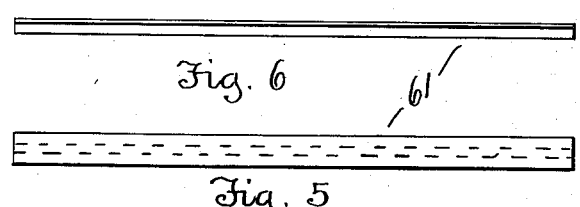
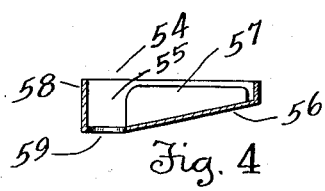
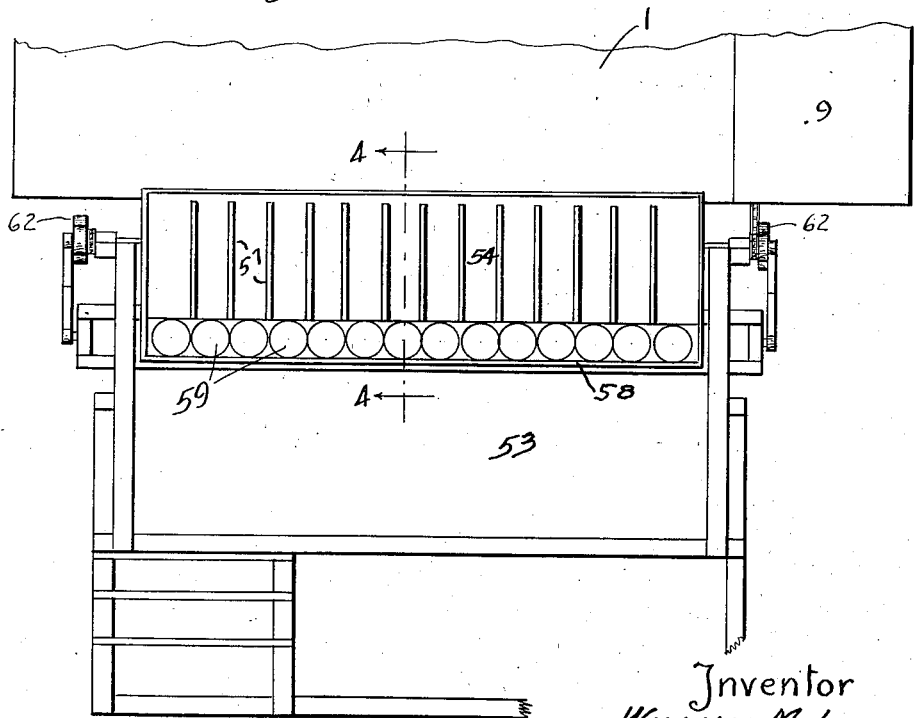
Inventor
WILLIAM M. LUTHER
By E. E. Sanzé
Attorney.

Inventor
WILLIAM M. LUTHER
By E. E. Sauzé
Attorney.

Inventor
WILLIAM M. LUTHER
By E. Sauzé
Attorney.

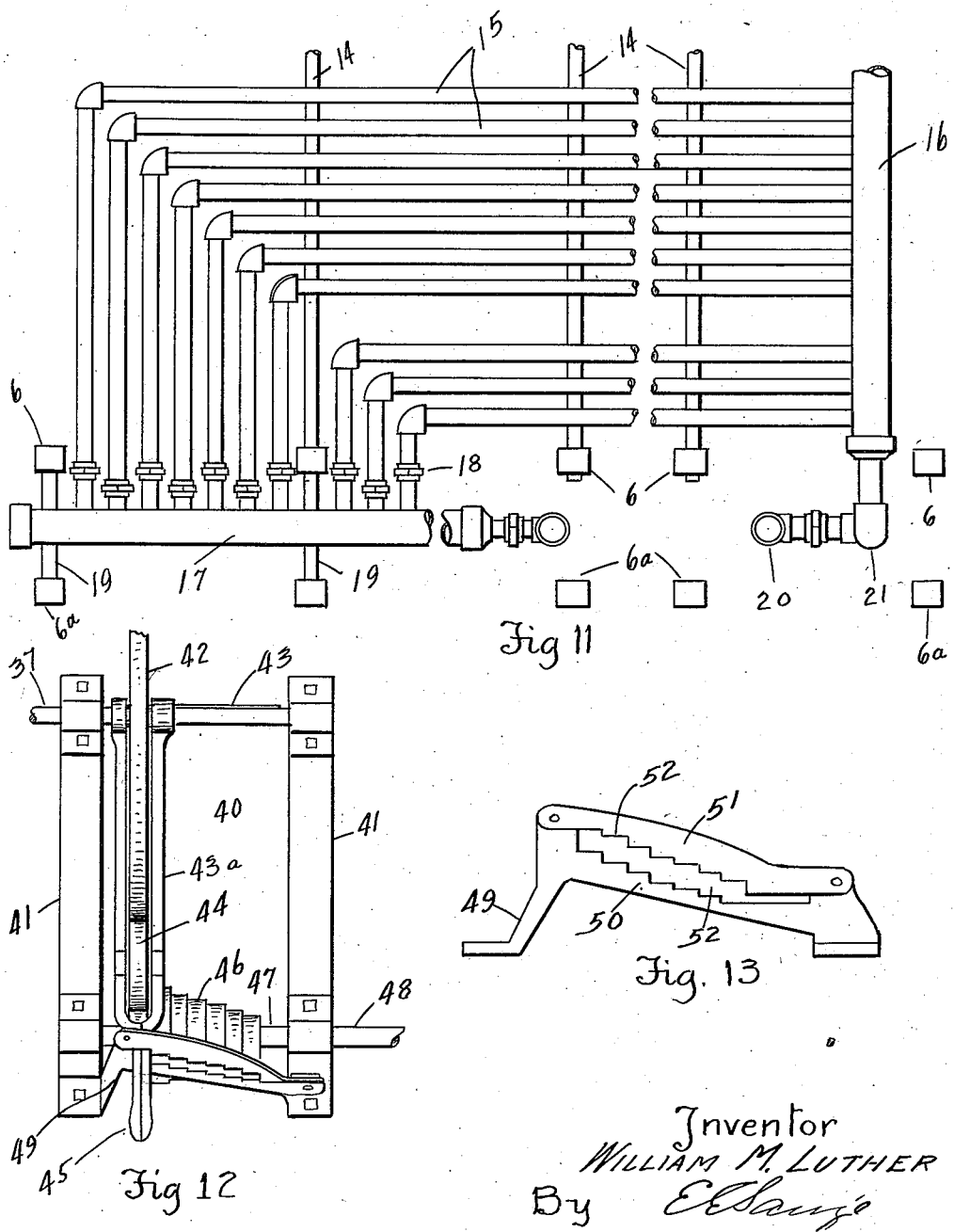

W. M. LUTHER.
DEHYDRATOR.
APPLICATION FILED SEPT. 26, 1919.

1,353,167.

Patented Sept. 21, 1920.
9 SHEETS—SHEET 9.

Inventor
WILLIAM M. LUTHER
By
Attorney.

UNITED STATES PATENT OFFICE.

WILLIAM M. LUTHER, OF WALLA WALLA, WASHINGTON.

DEHYDRATOR.

1,353,167. Specification of Letters Patent. Patented Sept. 21, 1920.

Application filed September 26, 1919. Serial No. 326,613.

*To all whom it may concern:*

Be it known that I, WILLIAM M. LUTHER, a citizen of the United States, residing at Walla Walla, in the county of Walla Walla and State of Washington, have invented certain new and useful Improvements in Dehydrators, of which the following is a specification.

This invention relates to dehydrators and has for its objects to provide a means for subjecting produce to the proper degree of heat, the proper amount of time, the regulation of the heat, the regulation of the time, the regulation of the humidity, of properly spreading the slices uniformly over the conveyer, handling the produce to be sliced and slicing said produce directly upon the receiving conveyer in such close proximity to the dehydrator that discoloration from the air is prevented.

In this invention which is designed to handle great quantities of produce automatically the details of construction and operation must of necessity be given due consideration as it is based on actual practice, machines having been constructed and in operation capable of handling ten tons of produce in a day; the drawings made a part of this application having been constructed from the data obtained from one of the constructed machines.

Reference is now had to my former patents #1,269,291, fruit slicing and spreading machine, dated June 11, 1918, and #1,132,020, fruit evaporator, dated March 16, 1915, and all parts contained herein in conflict therewith are hereby expressly disclaimed.

With the above and other objects in view reference is now had to the accompanying drawings in which—

Figure 1 is a rear view of the slicer and spreader attached to the dehydrator,

Fig. 2 is a rear elevation of the dehydrator and slicer and spreader,

Fig. 3 is a plan view of the slicer and spreader and table,

Fig. 4 is a section on line 4—4 of Fig. 3,

Fig. 5 is a plan view of the knife,

Fig. 6 is a side elevation of the knife,

Fig. 7 is a section of the knife,

Figure 9:
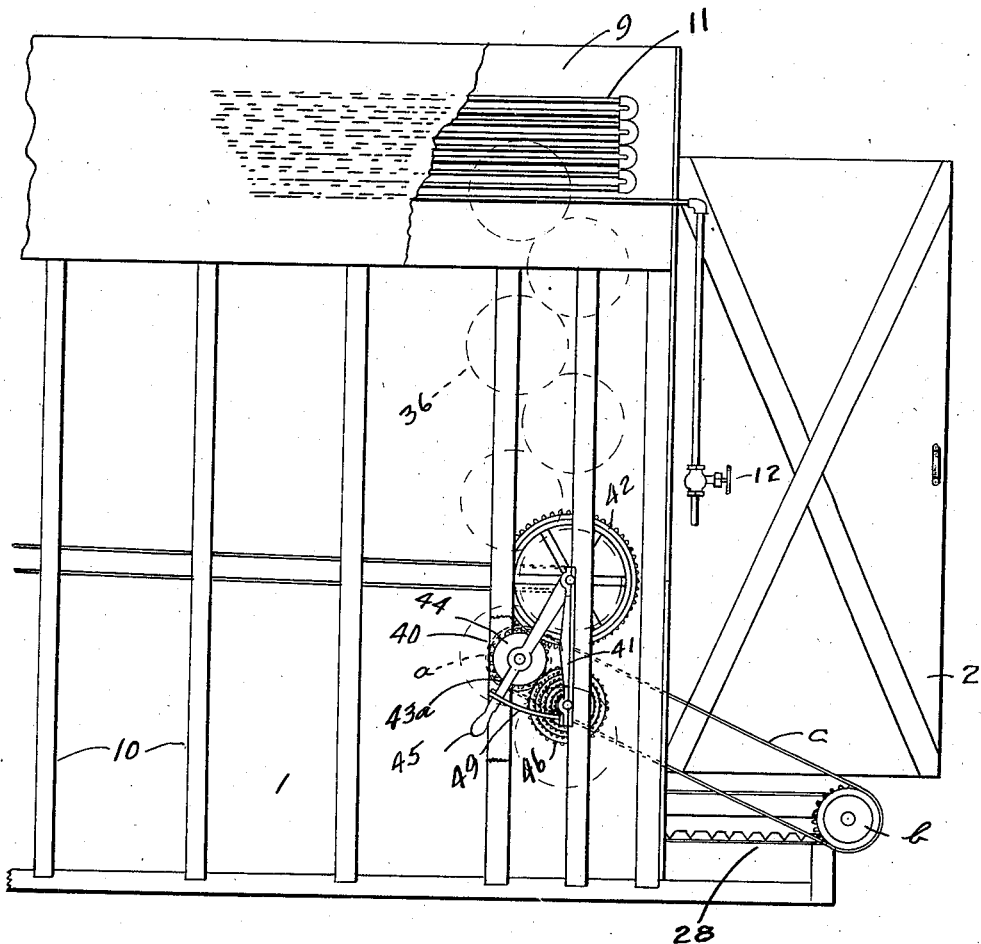
Figure 10:
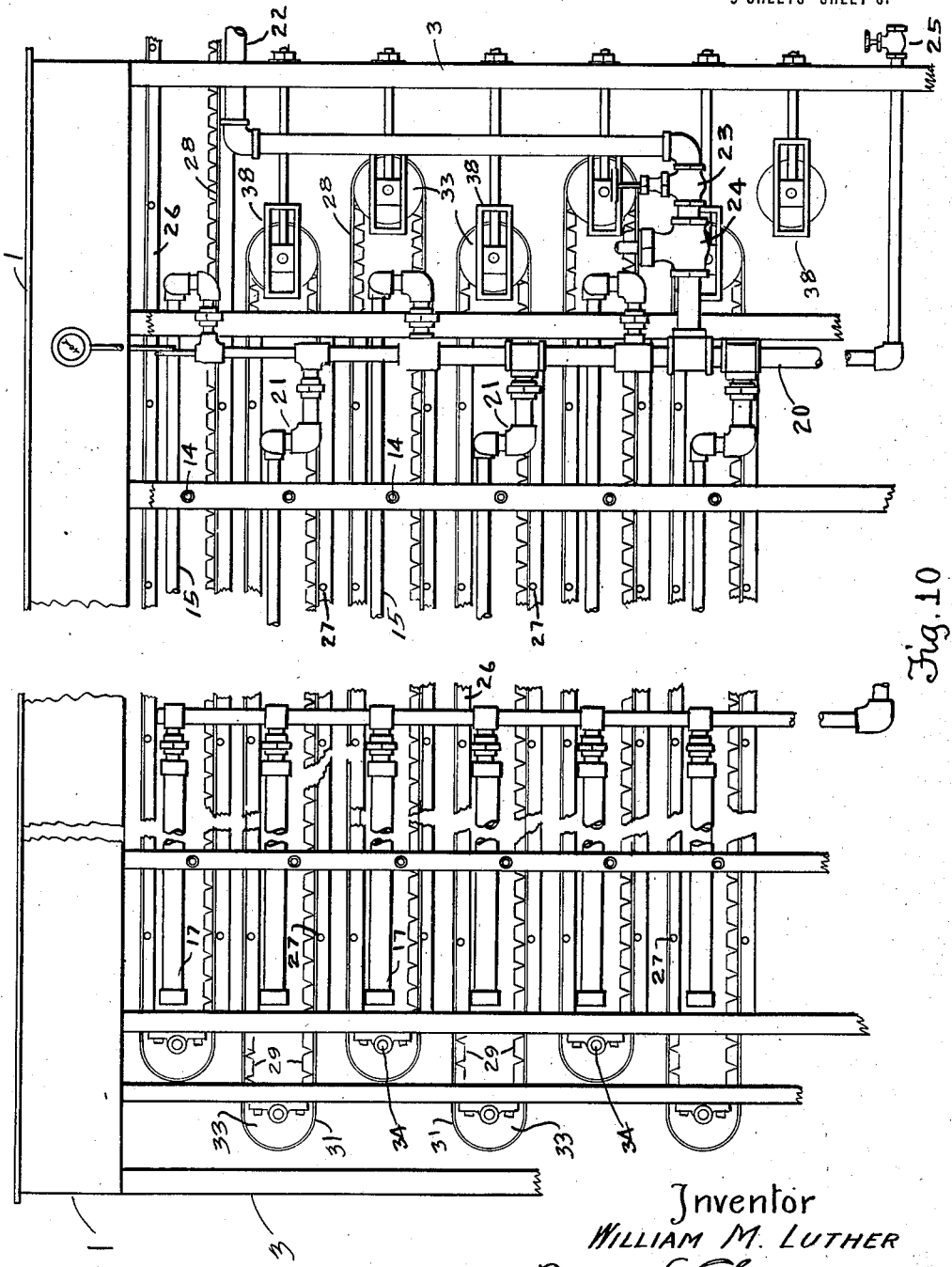
Figure 14:
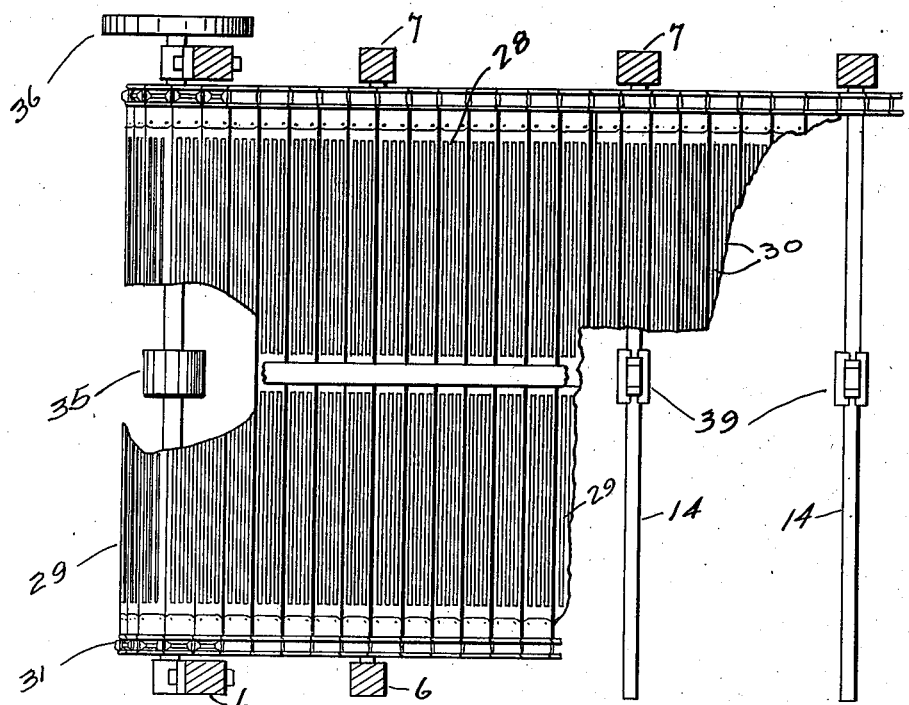
Figure 15:
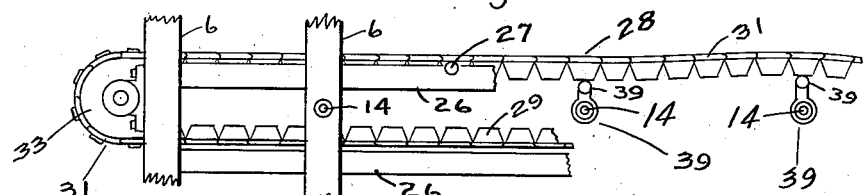
Figure 16:
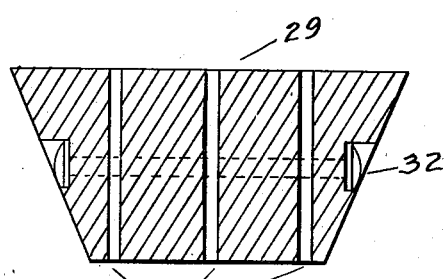
Figure 17:
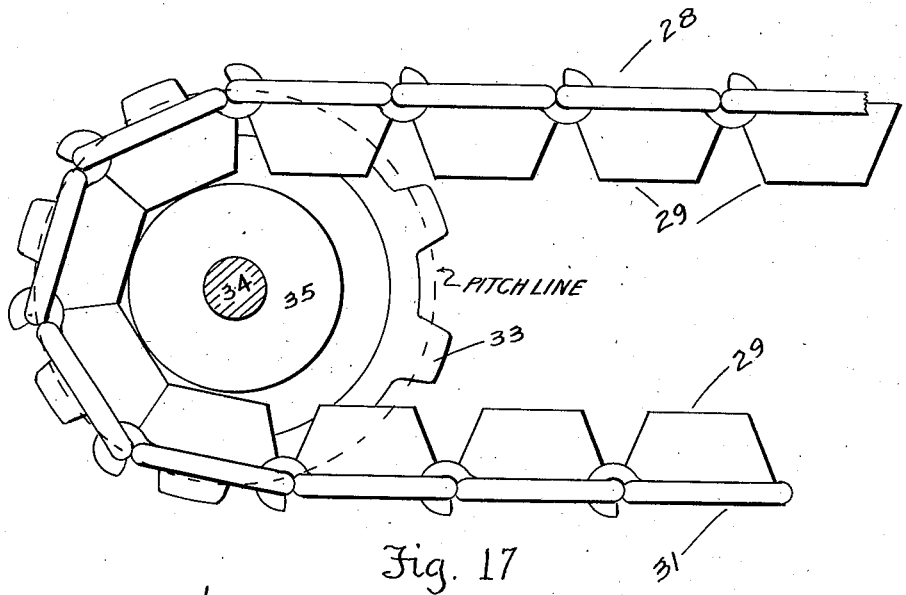
Figure 18:
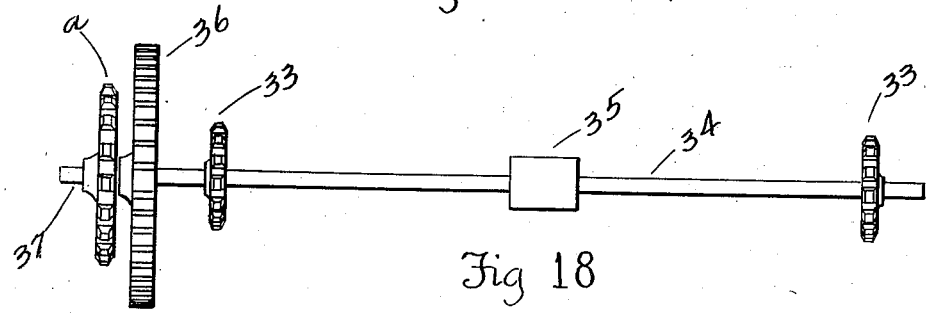
Figure 19:
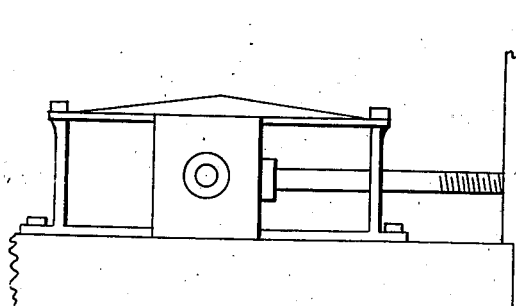

Fig. 9 is a partial rear elevation of the dehydrator showing variable speed device, Fig. 10 is a partial front elevation showing a part of the front end and rear end heating means and conveyers, Fig. 11 is a plan of the heating coils, Fig. 12 is the variable speed device in elevation, Fig. 13 is the locking device of the variable speed device, Fig. 14 is a partial plan view of the conveyer, Fig. 15 is a partial side elevation of the conveyer, Fig. 16 is a section of conveyer slat, Fig. 17 is a side elevation of one end of the conveyer, Fig. 18 is a drive shaft, and Fig. 19 is a side elevation of the takeup box showing its relation to the end wall of the case.

In the drawings like numerals represent like parts throughout and 1 represents the case which consists of an ordinary structure with the exception that closures 2 are provided at both ends and the front side of the dehydrator.

The frame upon which the case is constructed is formed of bents 3 consisting of a rafter member 4, a sill member 5, uprights 6 and 6ª, and 7 and 7ª, arranged in pairs with an air by-pass 8 between them. On the rear end at the upper side of the case 1 is located a condenser chamber 9 supported by the uprights 7ª and the posts 10, and within the chamber is contained a condenser 11 having a controlling means 12 in the shape of a valve.

Between the condensing chamber 9 and the case 1 is a baffle plate 13 placed in such a manner that the air current, represented by arrows, is thrown against the condensing medium at a height above the bottom line of the condensing medium.

Between the inner pair of uprights 6 and 7 respectively, of the bents, are lateral braces 14 so spaced as to provide a support for the heating coils and bearing rollers to be hereinafter mentioned and described.

The heating coils consist of a multiplicity of pipes 15 joined together at their ends by headers 16 and 17 respectively in such a manner that the header into which the pipes are screwed directly, is placed transversely in the inaccessible position between the elements of construction of the machine, while that header 17 is brought outside of the said elements into an accessible position to facilitate keeping the joints 18 tight, the union joints being necessary in the construction of the coils as will be understood by those skilled in the arts. The braces 19 are provided to support the headers.

The coils are built up of L shaped pipes 15 as by the construction expansion provisions within the coils need not be considered, the design affording ample room therefor from its very nature. There are two headers to each coil, one thereof being an inlet header 16 and one the outlet header 17; the inlet header is connected to a manifold 20 with an expansion joint 21 to take care of any expansion which might take place between this header and the manifold. The supply pipe 22 feeds the manifold through the valve 23 and the reduction valve 24, and connected with the bottom of said manifold in a drain valve 25 with which to release the condensation which takes place in the pipes when the steam first enters the heating units.

Tracks 26, attached to the uprights 6 and 7 respectively afford a support for the conveyers with which the machine is supplied, and that the conveyers may run with little friction rollers 27 are placed at intervals within these tracks. The conveyers 28 consist of slats 29 having slots 30 throughout their length and these slats are suitably fastened to a chain belt 31 and reinforced against splitting by the rivet 32. The chain belt 31 meshes with sprocket wheels 33 mounted on shafts 34, and intermediate the sprocket wheels are drums 35 properly mounted on the shafts to support the central part of the conveyers. Each of said shafts is journaled to the uprights 6 and 7 respectively at the drive end of the machine, and at one end of the shafts are mounted spur gears 36 which register one with another to give an alternate opposite direction to the movement of the conveyers. The main shaft is not shown in the drawings but is similar to the shaft shown in Fig. 18, and differs only in its length, the end 37 projecting to form part of the variable speed device, to be described, and is the medium through which all the conveyers are driven.

On the opposite end of the conveyers is an idle shaft of the same above description with takeup bearings 38 by which means the slack may be taken out of the conveyer belts. To facilitate the operation of these takeup bearings the operating means thereof projects through the case 1 and are there accessible.

The conveyers are supported centrally throughout their length by bearing rollers 39, as shown in Figs. 15 and 14 respectively, which are attached to the lateral braces 14 and have each alternate roller slightly elevated above the adjacent roller.

The upper receiving conveyer is extended outward to register with a slicer and spreader which is removably attached to the machine; and the lower discharging conveyer is extended outward at the opposite end of the machine.

The lower conveyer being extended necessitates a change in its driving means and this is accomplished by adding a sprocket wheel $a$ to one of the drive shafts 34 and conveying the power therefrom to a corresponding wheel $b$ through the chain $c$.

As has been described above the main drive shaft 37 is extended to form a part of the variable speed device 40. This shaft is journaled in a frame 41 which is attached to the upright 7$^a$ and the post 10, and carries a spur gear 42 which is slidably mounted on this shaft on a feather key 43. The spur gear 42 is provided with a hub which is finished to receive the yoke arm 43$^a$ which is revolubly mounted thereon. The yoke arm also carries a spur pinion 44 journaled therein in a position to be in constant mesh with the spur gear 42, and at the other end the yoke arm is extended to form a handle 45; it will now be noted that by means of the handle 45 the yoke arm may be raised and with it the spur pinion 44; and also that the spur gear may be moved horizontally along the shaft 37. Now a cone gear 46 is mounted on the shaft 47 which is journaled in the frame 41 with one of its ends projecting as at 48; and attached to this frame is a locking device 49 consisting principally of a pair of jaws 50 and 51 respectively. These jaws are provided with notches 52 with which to engage the handle 45 in register with any of the gears of the cone gear 46; so by moving the handle 45 the spur pinion 44 may be made to securely engage any gear of the cone gear and thus a predetermined speed given to the above mentioned conveyers.

Above the upper feeder conveyer, on the outside of and adjacent to the dehydrator is removably attached a slicer and spreader 53 above mentioned. The slicer and spreader has a table 54 attached to and movable with it consisting of a box 55 having an inclined floor 56, a series of division boards 57 and a retarding board 58; the floor 54 contains a series of holes 59 which register with the vertical chutes 60 through which the produce passes to the slicing knife 61.

In operation the produce, after paring and coring (such as needs coring), is elevated to a bleacher or blancher (not shown) and from there deposited onto the spreading table 54 of the slicer and spreader, which, as its name implies, slices and spreads the sliced produce directly upon the feeder conveyer of the machine. The table divides the produce into suitable piles by means of the division boards which prevents congestion of any one of the vertical chutes of the slicer and spreader, and gives a more equal distribution of the produce throughout the length of the machine.

The produce now comes in contact with the knife 61 which is preferably of bronze although any non-corrosive metal may be used, and is constructed with a rib on its under side and extending throughout its length, by means of which ample strength is given to the blade so as to avoid the use of many supports therefor.

The slicing operation requires a quick entrance stroke to cause the knife to enter the produce with the least resistance, and as the operation must be carried on in synchronized relation to the speed of the dehydrator to afford the proper spreading of the slices upon the conveyer, either a complete quick stroke, with a pause between them, must be used, or a quick entrance stroke must be adopted with a proper slowing up of the stroke in the center of its action. To provide this stroke any suitable mechanical device, such as cams, elliptical gears, etc. may be used: the elliptical gears 62, as shown, is my preferred form.

Many of the fruits and vegetables are subject to rapid discoloration upon exposure of the meat thereof to the air, and to avoid discoloration the produce is subjected to the dehydrating process immediately after slicing, the slicing taking place directly upon the feeder conveyer and directly adjacent to the dehydrator, in such a manner that there is very little elasped time between the slicing operation and the entrance of the produce into the dehydrator.

The produce before slicing and after paring, in its passage from the parer, is subjected to a bleaching or blanching process to preserve its color, this method in relation to slices is not practical as the slices in the raw state are very brittle and much is lost by manual manipulation, thus the slicer and spreader is absolutely essential to proper dehydration by avoiding handling, by preventing discoloration and by properly spreading the produce upon the conveyer in a manner to produce a mass of uniform thickness to be acted upon uniformly by the heat.

The conveyers are arranged in an upright stack, and the sliced produce is carried through the machine by dropping from one conveyer to another, finally passing out at the lower and opposite end of the conveyers from the reception end.

These conveyers have a wave like motion imparted to them in their travel by bearing rollers attached to the lateral braces between the pipes 15 of the heating coils. This motion prevents the produce sticking to the slotted slats of the conveyers by giving a continuous movement to the conveyer slats.

Figure 8:
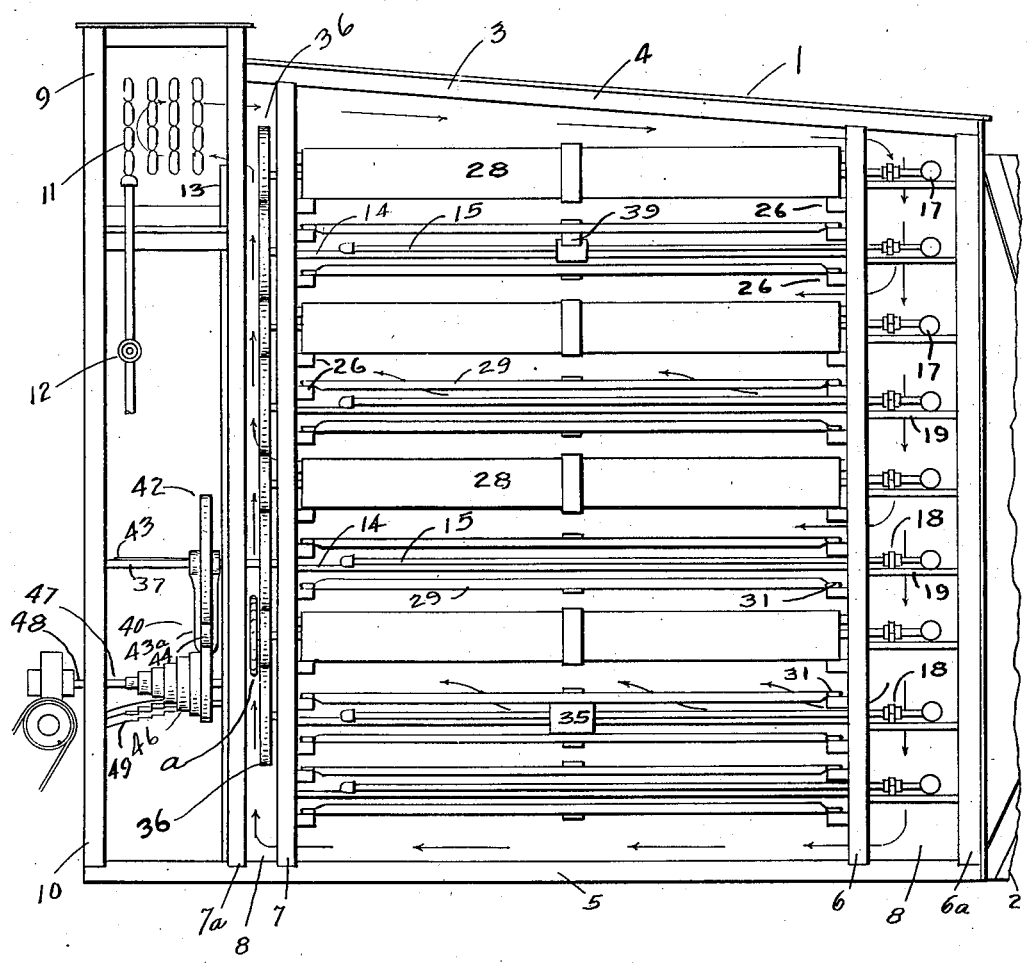
Fig. 8 is an end elevation of the dehydrator with part broken away.

In passing through the machine the produce is subjected to heat which radiates from the coils heating the air within the case. The heated air follows the course of the arrows, shown in Fig. 8, where it will be seen that the direction of the air current is up from the heating coils, through the slots of the slats composing the conveyer to the rear by-pass, up this by-pass to the baffle plate over which it travels to the condensing medium 11, back over the top of the conveyers, down the front by-pass, and return.

The heated air vaporizes the water in the produce forming a water laden vapor which, coming in contact with the condensing medium, is condensed, with a degree of condensation determined by the difference of temperature between the said medium and the said vapor. Now different fruits and vegetables require a different moisture content to be commercially acceptable as a dehydrated fruit or vegetable, therefore a means must be provided to regulate the condensation to prevent an over drying, or in other words the cells must not be destroyed in the process of dehydration else the restoration process, that of replacing the moisture, will be a failure and a woody product will result. Therefore a means must be provided to regulate this condensation which is accomplished by regulating the flow of the condensing medium by the valve 12 whereby the flow of the contents of the coils (the condensing medium shown) is retarded or released to permit the condensing medium to absorb a greater or less degree of heat from the heated air with the resultant condensation.

Produce varies in the degree of heat required for proper dehydration and it is therefore essential that the heat be controlled. This is accomplished by installing a reduction valve in the main steam pipe with a control valve the control valve regulating the flow and the reduction valve regulating the pressure and equalizing it between the headers.

Produce also varies in the amount of time necessary for the proper dehydration, the proper time for each species being determined by trial; thus to give each species the proper amount of time the variable speed device shown is adopted.

In the variable speed device the cone gear consists of seven gears representing seven speeds which are the full number of speeds deemed necessary to take care of the majority of fruits and vegetables, therefore by changing the gears for a particular predetermined speed the speed of the dehydrator and the speed of the slicer with it is obtained and maintained throughout the process of dehydration. A tailing conveyer may be used to remove the product or it may fall directly into boxes as desired.

Having thus described my invention I claim—

1. In a dehydrator, the combination of a case, a means for opening said case to the external temperature, bents supporting said case and arranged to provide an air by-pass within the walls of said case, lateral braces between the uprights of said bents, L shaped heating coils supported by said lateral braces, a conveyer about each of said heating coils, means for operating said conveyers with a vibratory or wave like motion, a means for operating said conveyers in alternately opposite directions, and with a variable speed, and a slicer and spreader having means to give the same an irregular translating motion removably attached to said dehydrator and operably connected with said dehydrator and in synchronized relation thereto.

2. In a dehydrator, the combination of a case, closures for the case, a condenser chamber attached to said case, a condenser within said chamber, and a controlling means to regulate the temperature of said condenser, a baffle plate interposed between the said chamber and the said case, bents supporting the said case, the uprights of said bents arranged in pairs, to provide an air by-pass, lateral braces between the inner pair of said uprights, L shaped heating coils supported by said lateral braces, tracks secured to the inner pair of said uprights and extended longitudinally of said dehydrator, rollers revolubly mounted in said tracks, endless conveyers arranged one above another in an upright stack, and to travel on said tracks, a means for providing a wavelike motion to said conveyers, a variable speed device in operable connection with said conveyers, and a slicing and spreading mechanism attached to and operable with said variable speed device to operate in synchronized relation with the speed of said dehydrator.

3. In a dehydrator, the combination of a case, a means for opening said case to the outside temperature, a controllable condenser, a baffle plate interposed between the said condenser and the said case, an air by-pass about the said case, and continued about the said condenser, a heating system consisting of a multiplicity of L shaped pipes united in a header at each end thereof, said headers being connected to a supply and discharge pipe respectively, a regulating means to control said system, continuous conveyers and means to impart to them a wave like motion within said dehydrator, a means for operating said conveyers in alternately opposite directions, a means for operating said conveyers at a predetermined speed, and a slicer and spreader attached to and operably connected with said dehydrator to operate in sychronized relation thereto.

4. In a dehydrator, the combination of a case, a controllable condenser attached to said case, bents supporting said case and having uprights in pairs with a space between said pairs of uprights to provide an air by-pass, lateral braces between the inner pairs of said uprights, a controllable heating system supported on said lateral braces, tracks secured to said inner uprights, a multiplicity of endless conveyers mounted on shafts and arranged to travel on said tracks and about said heating coils, means to impart to said conveyers a wave like motion throughout their length, each conveyer consisting of a multiplicity of slotted slats attached at each end thereof to a chain belt, with the surface of said slats on line with the pitch line of said chain belt, and having tapering sides to conform to the radial line of the sprocket wheels about which said conveyer travels, said sprocket wheels being carried by the above mentioned shafts, a means for operating said conveyers at a predetermined speed, and a slicer and spreader attached to and operably connected with said dehydrator to operate at the same predetermined speed.

5. In a dehydrator, the combination of a case, the front and end walls of said case constituting closures, a controllable condenser attached to said case, a baffle plate interposed between the condenser chamber and said case and situated with its upper side on a line above the lower line of said condenser, a multiplicity of bents supporting said case, each of said bents provided with a pair of uprights in the rear and a pair of uprights in the front, and with a space between each pair of said uprights to provide an air by-pass, a multiplicity of lateral braces joining the inner pair of said uprights and extending transversely of said dehydrator, L shaped heating coils supported by said lateral braces within said case, headers uniting the pipes of said heating coils and connected with a manifold, said manifold receiving the heating element through a reduction valve and having a drain valve in the lower portion thereof, tracks secured to the said inner uprights, a series of endless conveyers arranged to travel in alternately opposite directions on said tracks, each conveyer supported by a drive shaft at one end, and an idle shaft at the other end of said dehydrator, a succession of bearing rollers located beneath the upper half of each of said conveyers, and supported by said lateral braces and having each alternate roller slightly elevated above the adjacent roller thereto to give a wave-like motion to said conveyers, a means for operating said conveyers in alternately opposite directions, a means for operating said conveyers at a predetermined speed, and a slicer and spreader having operating means to give it an irregular motion removably attached to said dehydrator and operably connected therewith and in synchronized relation thereto.

6. In a dehydrator, the combination of a case, a controllable condenser attached to said case, a multiplicity of heating coils consisting of a series of L shaped pipes, with each series terminating at each end thereof in a header, one of said headers being the inlet header and the other one of said headers being the outlet header, the said inlet header being placed transversely of said dehydrator, and at one end thereof, and the said outlet header being placed longitudinally of said dehydrator, and at the other end thereof, the said inlet headers terminating in a manifold, a supply pipe connected with said manifold, a reduction valve interposed in said supply pipe before the manifold, a multiplicity of conveyers, means whereby said conveyers are carried to travel horizontally and with a wave like motion, each conveyer supported by a drive shaft at one end and an idle shaft at the other end, sprocket wheels carried by said shafts to mesh with said conveyers, a centrally located drum on each of said shafts, a tightening means attached to each of said idler shafts and operable from the outside of said case, each drive shaft carrying spur gears, and each spur gear meshing with the adjacent spur gear, to drive said conveyers in an alternately opposite direction, the upper of said conveyers projected through the end of said dehydrator to register with a slicer and spreader mechanism, and the lower of said conveyers extended outward through the opposite end of said dehydrator, a variable speed device operably connected with said conveyers, said variable speed device consisting of a driven gear, a yoke arm revolubly mounted on the hub of said driven gear, an idle gear revolubly journaled in said yoke arm, and positioned to remain in mesh with said driven gear, and to be placed in mesh with any one gear of a cone gear, a cone gear, a locking device, said yoke arm terminating in a handle, said handle extended to be engaged by and locked in place by said locking device, a slicer and spreader mechanism connected to and operated by and in synchronized relation with said variable speed device.

7. In combination with a dehydrator having conveying means and variable speed driving means therefor, a slicer and spreader, connected to and operable with said dehydrator, and with the same variable speed, and a means for operating said slicer and spreader to produce a rapid motion at the beginning of each cutting stroke thereof, and a slower motion intermediate the ends of the cutting stroke, and maintaining an averaged speed equal to and in synchronized relation with the speed of said conveying means.

8. In combination with a dehydrator having conveying means and variable speed driving means therefor, a slicer and spreader having a spreading table attached thereto and movable therewith, and synchronized to operate with said conveying means.

9. In combination with a dehydrator having a conveyer, a slicer and spreader having a plurality of vertical chutes, an inclined spreading table attached to and movable with said vertical chutes, at the upper end thereof, division boards suitably attached to the bottom of said table to form troughs, said troughs arranged to register with said chutes, a retarding board attached to said table and situated on the opposite side of said table from said division boards, said slicer and spreader removably and operably attached to said conveyer in synchronized relation therewith.

10. In combination with a dehydrator having a conveyer, a slicer and spreader having a plurality of vertical chutes, a spreading table attached to and movable with said vertical chutes, said table consisting of a bottom inclined toward said vertical chutes, and divided into a series of troughs, and having a retarding board attached thereto, said slicer and spreader removably and operably attached to said dehydrator and in synchronized relation with the speed of the conveyer.

11. In combination with a dehydrator having a conveyer, a slicer and spreader consisting of a plurality of vertical chutes, a spreading table consisting of a plurality of troughs, each trough in register with one of said chutes, and operably attached to said dehydrator in synchronized relation with the speed of the conveyer.

In testimony whereof I affix my signature.

WILLIAM M. LUTHER.